July 10, 1956  A. LEYER ET AL  2,753,724
BELT PULLEY
Filed April 1, 1953  3 Sheets-Sheet 1

INVENTORS:
ALBERT LEYER
LOTHAR BURGERSTEIN
BY Leon M. Strauss
AGT

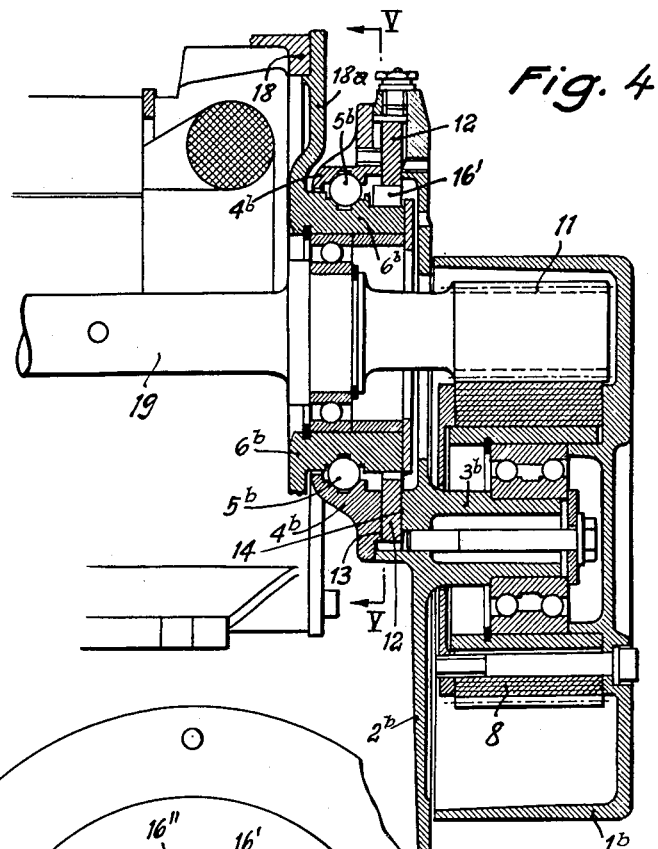
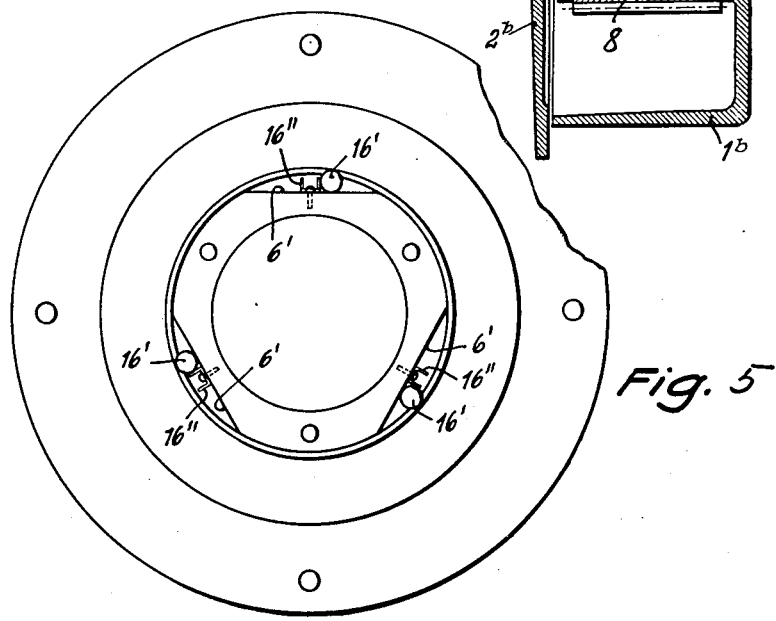

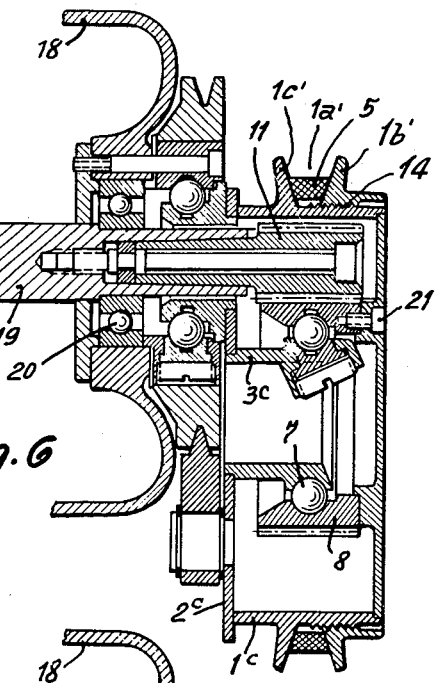
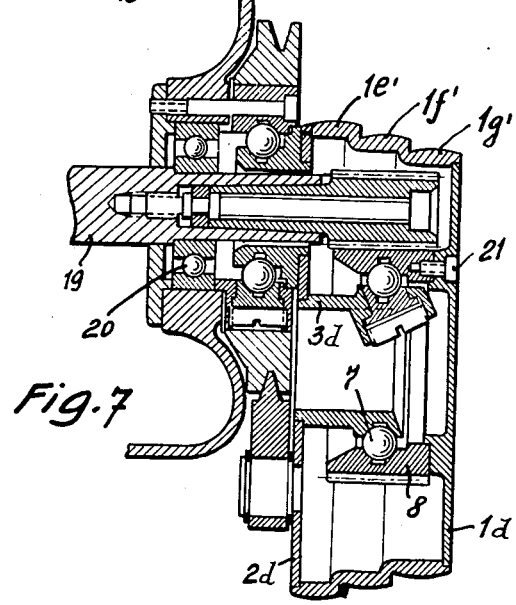

United States Patent Office 2,753,724
Patented July 10, 1956

2,753,724
BELT PULLEY

Albert Leyer, Zurich, and Lothar Burgerstein, Rapperswil, Switzerland

Application April 1, 1953, Serial No. 346,071

Claims priority, application Switzerland April 3, 1952

5 Claims. (Cl. 74—242.9)

The invention relates to a pulley drive mechanism having a belt pulley with a cavity-mounted toothed gearing, arranged on an arm, which is free to slew around the driving pinion in such a way that the power transmitting belt will automatically get tightened in accordance with the output.

From known belt pulleys of this kind the belt pulley according to this invention differs in that a brake is provided, which acts in combination with the slewable arm in such a way as to brake the slewing motion of the belt pulley with its tendency to slacken the belt, and in that the slewing arm, that carries the belt pulley, is supported by a ball- or roller-bearing, the races of this bearing being arranged directly on the casing of the bearing on the one hand, and to the hub of the slewing arm on the other hand.

With the arrangement of the brake that acts but in one direction of rotation, the pulley on the one hand is prevented from oscillating under multiple variation of load in rapid succession, while on the other hand it allows unhindered free action of the slewing arm in the sense of belt-tightening. Such free action of the slewing arm will considerably and additionally be furthered by the arrangement of a ball- or roller-bearing instead of the sleeve-bearing, which latter on account of the very higher friction, especially at the transition from the static to the dynamic friction, would considerably damp the free slewing of the pulley and largely reduce the capacity of reaction of the slewing arm in the case of a sudden increase of load.

It is further of great and practical importance to arrange the races of the bearing directly on portions of the casing of the bearing on the one hand, and on the hub of the slewing arm on the other. With this arrangement the slewing arm may be fitted quite closely so that the whole aggregate can be kept within small dimensions. Still a greater advantage of this embodiment of the invention, however, is the fact that ball- or roller-bearings, available on the market, can so be dispensed with since such bearings, ready for use, are very expensive, as known, since they are designed and made to suit exacting requirements and heavy duty, whereas for the purpose under consideration simple and cheap ball- or roller-bearings may be produced with simple means by factories and work-shops that do not require the special machinery indispensable for the production of precise bearings for heavy duty, since the demand for duty and capacity in the case of bearings to suit the requirements of the invention under consideration is but very low in view of the very small slewing motion.

The drawings represent three embodiments of the invention under consideration, wherein:

Fig. 4 is an axial section through the pulley of a third embodiment;

Fig. 5 is a section taken along line V—V of Fig. 4;

Fig. 6 is a longitudinal section through a portion of the device with a pulley for a belt which is wedge-shaped in cross-section; and Fig. 7 is another longitudinal section through a portion of the device with a cone pulley.

Figure 1:
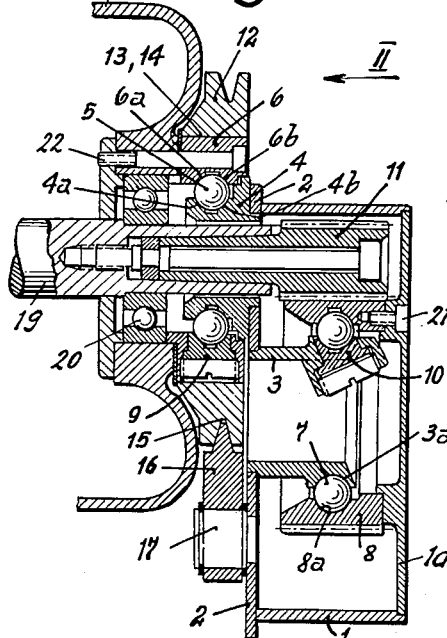
Fig. 1 is an axial section through the pulley.
Figure 2:
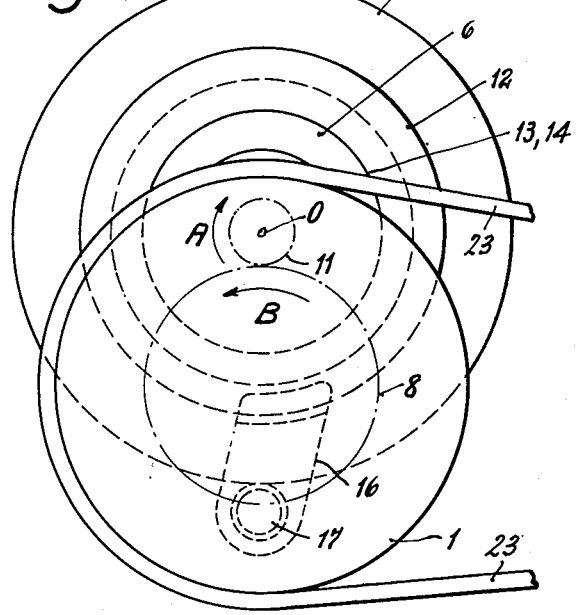
Fig. 2 is a frontal view seen in the direction of arrow II shown on Fig. 1.

In the embodiment of Figs. 1 and 2, 18 indicates the stator and 19 the rotor shaft of an electric motor. The rotor shaft 19 is supported with one end by a ball bearing 20, lodged in the stator 18, and to the extension of this shaft end, which passes through the bearing shield of the stator 18, a pinion 11 is fixed. This pinion meshes permanently with a toothed rim 8, which by means of a ball- or a roller-bearing 7 bears on the hollow stud 3 of a circular flat slewing arm 2. In the embodiment shown the outer rolling race 8a of the bearing 7 is directly arranged on the gear rim 8, whereas the inner race 3a of the bearing is arranged on the stud 3. 10 is a threaded plug on the stud 3, after removal of which the balls or rollers 7 may be removed between the races 3a and 8a or withdrawn therefrom.

1 is the belt pulley, co-axial with the stud 3, of which the front disc 1a is fixed to the gear rim 8 by means of screws 21.

The slewing arm 2 and stud 3, that carries the pulley, is rigidly fixed to the inner race 4 of a ball- or roller-bearing, so that the latter at the same time serves as a hub for the slewing arm 2. 5 denotes the balls or the rollers of this bearing and 6 is the outer supporting ring, which at the same time serves as a casing for the bearing and which is rigidly fixed to the bearing shield of the stator 18 by means of the screws 22. The inner races 4a and 4b of the bearing, that supports the slewing arm 2 and stud 3, are directly arranged on the race ring 4, whereas the outer races 6a and 6b of the same bearing are arranged on the supporting ring 6. 9 is a tap screwed into the supporting ring 6, after removal of which the races of the bearing may be filled with balls or rollers 5 or the latter withdrawn.

To the pulley just described a brake is added, which is so combined with the slewing arm 2 and stud 3 that it damps the slewing motion of the pulley in the case that such motion should act to slacken the belt. This brake includes two items, one of which is the fixed supporting ring 6, the other an outer collar 12. Both items, the supporting ring 6 and the collar 12, are journalled within the range of two smooth cylindrical contacting surfaces 13 and 14, respectively, whereby the inner collar 6 is fixed whereas the outer collar 12 co-operates with the slewing arm 2 and stud 3 of the pulley 1 by means of the interposed friction ratchet 15, 16 and 17, respectively. Between the journal surfaces 13, 14 of the items 6, 12, respectively, a viscous liquid film, such as a viscous oil film, a very viscous cylinder oil for instance, is provided. Cohesion and adherence of such an oil film damp the relative displacement of the collar 12 on the supporting ring 6, thus acting as a brake.

With the embodiment of the invention as described above the pinion 11, which revolves in the direction of the arrow A (Fig. 2) and drives the toothed rim in the opposite direction B, is urged by the pressure of the contacting teeth to slew clock-wise on the pivot stud 0 and to tighten at the same time the belt 23.

Any heavier load of the motor will result, by the correspondingly higher pressure of the meshing teeth of the pinion 11, in a higher slewing torque of the slewing arm 2 and stud 3, i. e., of the belt pulley 1, thus further urging the pulley to slew clockwise on the center 0 and to additionally tighten the belt 23 in accordance with the higher transmitting torque. At any clockwise slewing displacement of the pulley, i. e., of the slewing arm 2 and stud 3, the friction pawl 16 slips in the wedged circumferential groove 15 of the collar 12. The friction pawl 16 is permanently urged by a spring (not shown) to contact with the wedged groove 15 of the collar 12. Very often it happens that the demand for power, i. e. for torque, by the belt driven machine, suddenly drops. In such a case the motor with its pinion 11 will suddenly relax too in accordance therewith, with the result that owing to the tension of the belt the slewing arm 2 and stud 3, i. e., the pulley 1, will be slewed to the opposite direction, i. e., counterclockwise. With any such slewing of the pulley the outer collar 12 of the brake will be drawn along by the friction pawl 16, whereby the oil film between the journal surfaces 13 and 14, respectively, will damp, to some extent, the slewing of the pulley and thus in a simple way prevent the slewing arm 2 and stud 3 and the pulley 1 from oscillating as an effect of load variation in rapid succession.

Figure 3:
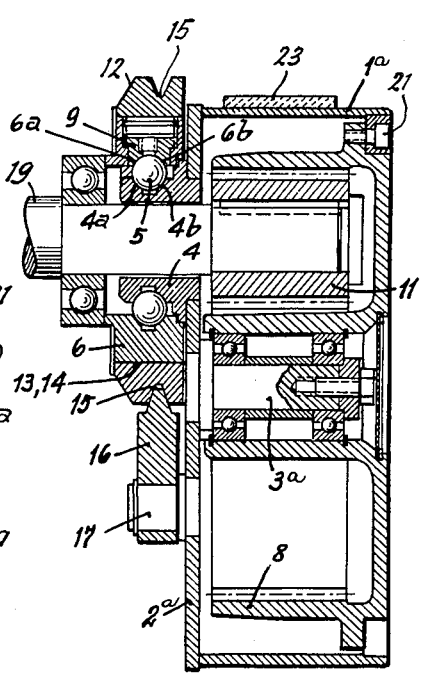
Fig. 3 is an axial section through the belt pulley and the toothed gearing according to a second embodiment.

With the second embodiment, according to Fig. 3, $1a$ indicates the belt pulley, $2a$ the slewing arm of the same with the stud $3a$ on which the pulley is journalled, 4 indicates the race of the bearing with the balls or rollers 5, which race at the same time acts as a hub of the slewing arm, and, with the outer fixed supporting ring 6, which, likewise as in the former embodiment, is fitted with a threaded tap 9 through which the balls or the rollers may be dropped between the races $4a$, $4b$ and $6a$, $6b$ respectively. 12 indicates again the outer braking ring, journalled on the supporting ring 6, and 13, 14 the contacting surfaces of the two braking items 6, 12, respectively, separated by a viscous oil film. Similar to the first embodiment, in the outer braking ring 12 a wedge shaped groove 15 is provided along its circumference with which a friction pawl 16, journalled on the stud 17 of the slewing arm 2, engages.

Contrary to the embodiment discussed above, with the embodiment of Fig. 3 the pinion 11 on the rotor shaft 10 permanently meshes with a rim toothed inside and rigidly fixed to the pulley $1a$ by means of screws 21.

With the third embodiment of Figs. 4 and 5, $1b$ indicates the belt pulley, $2b$ the slewing arm of the same with the stud $3b$ on which the pulley is journalled, $4b$ the race of the bearing screwed to the slewing arm $2b$ and with the balls or rollers 5 and further with the inner fixed supporting ring $6b$, which in this embodiment is made in one piece with the bearing shield $18a$ of the motor casing 18. 12 indicates a damping ring inserted between the outer race $4b$ and the slewing arm $2b$, and 13 and 14 are the sliding faces between the damping ring on the one hand and the race $4b$, i. e., the slewing arm $2b$, on the other hand.

Contrary to the two embodiments discussed above, with the embodiment of Figs. 4 and 5, respectively the slewing arm is fitted on the supporting ring $6b$ from the outside, the latter being cast in one piece with the bearing shield $18a$ and which is given the shape of a hub. As a friction ratchet between the hub, i. e. the supporting ring $6b$ and the damping ring 12, three pawls $16'$ are arranged between the flats $6'$ on the hub $6b$ and the bore of the damping ring 12, which, as usual, are held in their checking position by springs $16''$, fixed to the hub $6b$.

In order to keep the single balls or rollers separated from each other, it is recommended to insert distance pieces between them, for instance plugs of wood or felt, soaked in oil and the like.

Instead of providing but one friction pawl, as shown, it is advisable to provide three friction pawls, pitched at angles of 120 degrees apart in order to compensate the pressures.

It is also feasible, as shown in Fig. 4, to make the shaft 19 and the pinion in one piece, i. e., to cut the pinion teeth into the shaft itself, i. e., into a thicker portion of same. It is further advisable to make the gear 8 (Fig. 4) of a self-lubricating material, such as rawhide, for instance.

With the embodiment of Fig. 6 the pulley $1c$ has a circumferential wedged groove $1a$, whereby the flange $1b$ which limits the width of the groove on one side, can be axially displaced with regard to its mate $1c'$ in order to vary the ratio of the gearing. For this purpose the flange $1b'$ is screwed on to a threaded cylindrical extension 14 of the counter-flange $1c'$ that carries the disc $1c$ and can, by revolving it, be adjusted with regard to its mate, i. e., the disc $1c'$, in such a way that the belt of wedged section will run on a larger or shorter diameter, depending on how the flange $1b'$ is approached to its mate, the flange $1c'$, or spaced from it. $2c$ is the slewing arm, whereas $3c$ designates the stud.

With the embodiment of Fig. 7 the pulley $1d$ is made as a cone pulley having three steps $1e'$, $1f'$ and $1g'$, for instance. The stud is indicated as $3d$ and the slewing arm as $2d$.

Having thus described the invention, what is claimed as new and desired to be secured by Letters Patent, is:

1. In a pulley drive mechanism having a drive shaft with a support therefor, a slewing arm including a pulley, and means operatively connecting said shaft with said pulley; a hub connected to said slewing arm and mounted for free rotation about said shaft whereby said slewing arm and said pulley are angularly displaceable relative thereto, a ring member fixed to said support and surrounding said hub, bearing means between said hub and said fixed ring member, a collar rotatably carried on said ring member, and pawl means frictionally resisting rotation of said collar on said ring member means carried by said slewing arm and normally positioned for slight contact with said collar, whereby upon sudden displacement of said pulley relative to said shaft due to sudden reduction in load exerted upon said pulley a braking effect takes place between said collar and said ring member due to action of said pawl means on said collar, thereby damping said pulley in adjusting same to the reduced load.

2. In a driving mechanism according to claim 1, wherein said fixed ring member is integral with said support.

3. In a driving mechanism according to claim 1, wherein said collar is provided with a wedge-shaped groove on the periphery thereof, said pawl means being correspondingly shaped for engagement therewith.

4. In a driving mechanism according to claim 1, wherein an oil film forms said frictionally resisting means and is interposed between said collar and said fixed ring member.

5. A pulley drive mechanism having a drive shaft, a stator supporting said shaft, and a slewing arm with a pulley operatively connected to said shaft; a first member mounted for free rotation about said shaft, said first member being connected to said slewing arm and said pulley whereby said slewing arm and said pulley are displaceable about the axis of said shaft, a second member fixedly connected to said stator and encompassing said first member, bearing means between said first member and said second member, and one-way-braking means slidably engaging said second member and including a third member interconnecting said slewing arm with said braking means and normally in slidable engagement with the latter, whereby upon sudden displacement of said pulley relative to said shaft due to sudden reduction in load exerted on said pulley said third member brakingly engages said braking means, thereby damping oscillatory movement of said pulley during its adjustment to the reduced load.

References Cited in the file of this patent

UNITED STATES PATENTS

| | | |
|---|---|---|
| 1,578,785 | Wearn | Mar. 30, 1926 |
| 1,902,980 | Wilhelm | Mar. 28, 1933 |
| 2,108,367 | Christian | Feb. 15, 1938 |
| 2,396,860 | Lee | Mar. 19, 1946 |